(12) United States Patent
Patel

(10) Patent No.: US 7,678,899 B2
(45) Date of Patent: Mar. 16, 2010

(54) PHTHALOCYANINES AND THEIR USE IN INK-JET PRINTERS

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 900 days.

(21) Appl. No.: 10/564,959

(22) PCT Filed: Jul. 2, 2004

(86) PCT No.: PCT/GB2004/002854

§ 371 (c)(1),
(2), (4) Date: Jan. 18, 2006

(87) PCT Pub. No.: WO2005/014724

PCT Pub. Date: Feb. 17, 2005

(65) Prior Publication Data

US 2006/0201384 A1    Sep. 14, 2006

(30) Foreign Application Priority Data

Jul. 18, 2003  (GB) ................. 0316852.3
Jul. 25, 2003  (GB) ................. 0317414.1

(51) Int. Cl.
    C07B 47/00    (2006.01)
    C09D 11/00    (2006.01)
(52) U.S. Cl. .................. 540/145; 106/2; 106/31.49
(58) Field of Classification Search .......... 540/145; 106/2, 31.49
    See application file for complete search history.

(56) References Cited

U.S. PATENT DOCUMENTS

| | | | |
|---|---|---|---|
| 2,285,359 A | 6/1942 | Rösch et al. ............ 260/214 |
| 2,300,572 A | 11/1942 | Hoyer et al. ............ 260/214 |
| 2,414,374 A | 1/1947 | Haddock et al. ......... 260/314.5 |
| 3,365,463 A | 1/1968 | Groll et al. ............. 260/314.5 |
| 3,622,263 A | 11/1971 | Groll et al. ............. 8/178 |
| 3,679,675 A | 7/1972 | von Tobel ............. 260/242 |
| 4,791,165 A | 12/1988 | Bearss et al. .......... 524/516 |
| 5,098,474 A | 3/1992 | Pawlowski et al. ....... 106/22 |
| 5,183,501 A | 2/1993 | Kawashita et al. ....... 106/22 D |
| 5,382,283 A | 1/1995 | Yui et al. ............. 106/22 R |
| 5,739,319 A | 4/1998 | Yamasaki ............. 540/140 |
| 5,879,439 A | 3/1999 | Nagai et al. ........... 106/31.28 |
| 5,993,524 A | 11/1999 | Nagai et al. ........... 106/31.27 |
| 6,362,348 B1 | 3/2002 | Takahashi et al. ....... 549/315 |
| 6,379,441 B1 | 4/2002 | Kanaya et al. ......... 106/31.27 |
| 6,444,807 B1 | 9/2002 | Wolleb et al. |
| 2001/0011396 A1* | 8/2001 | Carr ................. 8/445 |
| 2003/0217671 A1 | 11/2003 | Ozawa ............... 106/31.49 |
| 2004/0045478 A1 | 3/2004 | Tateishi et al. ......... 106/31.49 |
| 2004/0099181 A1 | 5/2004 | Tateishi et al. ......... 106/31.47 |
| 2005/0073563 A1 | 4/2005 | Hanaki et al. .......... 347/100 |
| 2005/0076807 A1 | 4/2005 | Ogawa et al. ......... 106/31.49 |
| 2005/0081745 A1 | 4/2005 | Ogawa et al. ......... 106/31.27 |
| 2005/0215773 A1 | 9/2005 | Tateishi et al. ......... 534/653 |

FOREIGN PATENT DOCUMENTS

| | | |
|---|---|---|
| BE | 536200 | 9/1955 |
| EP | 1 473 335 A1 | 11/2004 |
| EP | 1 607 445 A1 | 12/2005 |
| EP | 1 609 824 A1 | 12/2005 |
| GB | 496663 | 12/1938 |
| GB | 704231 | 2/1954 |
| GB | 784843 | 10/1957 |
| GB | 921250 | 3/1963 |
| GB | 937182 | 9/1963 |
| GB | 1039379 | 8/1966 |
| JP | 2003-80072 | 3/2003 |
| JP | 2003-90485 | 3/2003 |
| JP | 2003-095292 | 3/2003 |
| JP | 2003-289492 | 8/2003 |
| WO | WO 98/49239 | * 11/1998 |
| WO | WO 98/49240 | 11/1998 |
| WO | WO 01/66647 | * 9/2001 |
| WO | WO 01/66647 A1 | 9/2001 |
| WO | WO 01/66648 | * 9/2001 |

(Continued)

OTHER PUBLICATIONS

Schofield et al., "Analysis of sulphonated phthalocyanine dyes by capillary electrophoresis", Journal of Chromatography, 770:345-348 (1997).
Color Index, p. 4619, No. 74220, C.I. Acid Blue 249.

*Primary Examiner*—James O. Wilson
*Assistant Examiner*—Paul V. Ward
(74) *Attorney, Agent, or Firm*—Morgan, Lewis & Bockius LLP

(57) ABSTRACT

A mixture of phthalocyanine dyes of Formula (1) and salts thereof:

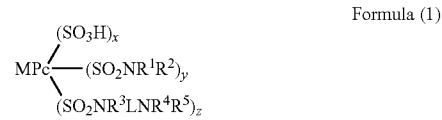

Formula (1)

wherein M is Cu or Ni; Pc represents a phthalocyanine nucleus; L is, for example, $C_{1-20}$ alkylene; $R^1$, $R^2$, $R^3$ and $R^4$ independently are H or optionally substituted $C_{1-4}$ alkyl; $R^5$ is H or an optionally substituted hydrocarbyl; or $R^4$ and $R^5$ together with the nitrogen atom to which they are attached represent an optionally substituted aliphatic or aromatic ring system; x, y and z are each 0.1 to 3.8 where the sum of (x+y+z) is 4; and the substituents, represented by x, y and z, are attached only to a β-position on the phthalocyanine ring. This mixture can be used to make inks suitable for use in an ink jet printer.

17 Claims, No Drawings

FOREIGN PATENT DOCUMENTS

| WO | WO 01/66648 A1 | 9/2001 |
| WO | WO 03/068866 * | 8/2003 |
| WO | WO 03/068866 A1 | 8/2003 |
| WO | WO 03/089532 A1 | 10/2003 |
| WO | WO 2004/035700 A1 | 4/2004 |
| WO | WO 2004/035701 A1 | 4/2004 |

* cited by examiner

PHTHALOCYANINES AND THEIR USE IN INK-JET PRINTERS

This is a 371 of PCT/GB04/02854, filed Jul. 2, 2004 and claiming priority based on UK 0316852.3, filed Jul. 18, 2003 and UK 031 74141 filed Jul. 25, 2003.

This invention relates to new dyes, to inks, to printing processes, to printed-substrates and to ink-jet printer cartridges.

Ink-jet printing is a non-impact printing technique in which droplets of ink are ejected through a fine nozzle onto a substrate without bringing the nozzle into contact with the substrate.

Colour ink-jet printers typically use four inks of differing hues: magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

With the advent of high-resolution digital cameras and ink-jet printers it is becoming increasingly common to print off photographs using an ink-jet printer. This avoids the expense of conventional silver halide photography and provides a print quickly and conveniently.

While ink-jet printers have many advantages over other forms of printing and image development there are still technical challenges to be addressed. For example, there are the contradictory requirements of providing dyes that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer. Furthermore, the resultant images desirably do not fade rapidly on exposure to light or common oxidising gases such as ozone.

Most cyan colorants used in ink-jet printing are based on phthalocyanines and problems of fading and shade change on contact with ozone are particularly acute with dyes of this class.

Thus, the present invention provides a mixture of phthalocyanine dyes of Formula (1) and salts thereof:

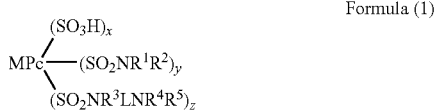

Formula (1)

wherein:

M is Cu or Ni;

Pc represents a phthalocyanine nucleus of formula;

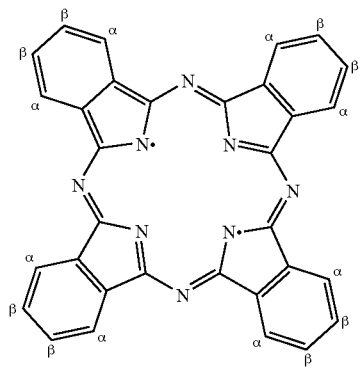

L is optionally substituted $C_{1-20}$ alkylene, alkenylene or alkynylene, optionally interrupted by —O—, —NH— or —S—;

$R^1$, $R^2$, $R^3$ and $R^4$ independently are H or optionally substituted $C_{1-4}$alkyl;

$R^5$ is H or an optionally substituted hydrocarbyl; or $R^4$ and $R^5$ together with the nitrogen atom to which they are attached represent an optionally substituted aliphatic or aromatic ring system;

x is 0.1 to 3.8;

y is 0.1 to 3.8;

z is 0.1 to 3.8;

the sum of (x+y+z) is 4; and the substituents, represented by x, y and z, are attached only to a β-position on the phthalocyanine ring.

When a dye of Formula (1) is made by the more usual route of sulfonating a phthalocyanine pigment followed by chlorination and then amination/amidation the resultant product carries sulfo and sulfonamide/substituted sulfonamide substituents in any susceptible position (for example see Schofield, J and Asaf, M in Journal of Chromatography, 1997, 770, pp345-348).

The phthalocyanine dyes of Formula (1) where the sulfo and sulfonamide substituents are attached to a β position on the phthalocyanine ring may be prepared by any method known in the art, and particularly by cyclisation of appropriate β-sulfo substituted phthalic acid, phthalonitrile, iminoisoindoline, phthalic anhydride, phthalimide or phthalamide in the presence of a suitable nitrogen source (if required), a copper or nickel salt, such as $CuCl_2$, and a base such as 1,8-diazabicyclo[5.4.0]undec-7-ene (DBU) followed by chlorination, amination/amidation. When L is an amino group then amidation may be carried out using an amine with an active substituent, and then a second amidation.

Preferably phthalocyanine dyes of Formula (1) where the sulfo, sulfonamide and substituted sulfonamide substituents are attached to a β-position on the phthalocyanine ring are prepared by cyclisation of 4-sulfo-phthalic acid in the presence of a nitrogen source, such as urea, a copper or nickel salt, such as $CuCl_2$, and a base such as 1,8-diazabicyclo[5.4.0]undec-7-ene (DBU) to give phthalocyanine β-tetrasulfonic acid. The phthalocyanine β-tetrasulfonic acid is then chlorinated and the sulfonyl chloride groups so formed are reacted with compounds of formula $HNR^1R^2$ and $HNR^3L\ NR^4R^5$ or $HNR^3X$ wherein L, $R^1$, $R^2$, $R^3$, $R^4$ and $R^5$ are as hereinbefore defined and X is an active leaving group, preferably halide and more preferably chloride. This reaction is preferably performed in water at a pH above 7. Typically the reaction is performed at a temperature of 30 to 70° C. and is usually complete in less than 24 hours. The compounds of formula $HNR^1R^2$ and $HNR^3X$ may be used as a mixture or added sequentially.

When amidation is carried out using a compound of formula $HNR^3X$. Then the —$SO_2NR^3X$ substituent, so formed, on the phthalocyanine is then further reacted with a compound of formula $HNR^4R^5$ to give a mixture of phthalocyanine dyes of Formula (1).

Many of the compounds of formula $HNR^1R^2$, $HNR^3L\ NR^4R^5$ and $HNR^3X$ are commercially available, for example ammonia and 2-chloroethylamine, others may be made easily by a skilled person using methods which are well known in the art.

The ratio of sulfo to the different sulfonamide substituents may be varied by varying the nature and amount of chlorinating agent used, the relative amounts of compounds of formula $HNR^1R^2$ and $HNR^3L\ NR^4R^5$ or $HNR^3X$ used and the reaction conditions in both reactions.

A skilled person will appreciate that the product of these reactions will be a disperse mixture and so the values of x, y and z will represent an average of the groups present in the mixture.

When phthalocyanine β tetrasulfonic acid is an intermediate in a route to dyes of Formula (1) it may be chlorinated by reacting with any suitable chlorinating agent.

Chlorination is preferably carried out by treating the phthalocyanine β tetrasulfonic acid with chlorosulfonic acid preferably in the presence of an acid halide such as thionyl chloride, sulfuryl chloride, phosphorous pentachloride, phosphorous oxychloride and phosphorous trichloride.

M is preferably Cu.

In a first preferred embodiment $R^1$, $R^2$, $R^3$ and $R^4$ independently are H or methyl, more preferably $R^1$, $R^2$, $R^3$ and $R^4$ are all H.

In this first preferred embodiment $R^5$ is preferably H; optionally substituted aryl, especially optionally substituted phenyl or naphthyl; optionally substituted alkyl, especially optionally substituted $C_{1-4}$-alkyl or optionally substituted heterocycyl. More preferably $R^5$ is phenyl, especially phenyl bearing at least one sulfo, carboxy or phosphato substituent and having further optional substituents. It is especially preferred that $R^5$ is phenyl bearing a single sulfo, carboxy or phosphato substituent, particularly phenyl bearing a single sulfo substituent.

In a second preferred embodiment $R^1$, $R^2$ and $R^3$ independently are H or methyl, more preferably $R^1$, $R^2$ and $R^3$ are all H.

In the second preferred embodiment $R^4$ and $R^5$ together with the nitrogen atom to which they are attached represent an optionally substituted mono, bi or tricyclic aliphatic or aromatic ring. More preferably $R^4$ and $R^5$ together with the nitrogen atom to which they are attached represent an optionally substituted 3 to 8 membered aliphatic or aromatic ring. It is especially preferred that $R^4$ and $R^5$ together with the nitrogen atom to which they are attached represent an optionally substituted 5- or 6-membered aliphatic or aromatic ring. The optionally substituted aromatic or aliphatic ring formed by $R^4$ and $R^5$ together with the nitrogen atom to which they are attached may comprise at least one further hetero atom. Examples of preferred ring systems include imidazole, pyrazole, pyrrole, benzimidazole, indole, tetrahydro(iso)quinoline, decahydro(iso)quinoline, pyrrolidine, pyrroline, imidazolidine, imidazoline, pyrazolidine, pyrazoline, piperidine, piperazine, indoline, isoindoline, thiazolidine and morpholine. Particularly morpholine.

L is preferably optionally substituted $C_{1-20}$ alkylene optionally interrupted by —O—, —NH— or —S—, more preferably L is optionally substituted $C_{1-12}$ alkylene optionally interrupted by —O—, —NH— or —S—. It is especially preferred that L is optionally substituted $C_{1-8}$ alkylene optionally interrupted by —O—, —NH— or —S—, more especially L is optionally substituted $C_{1-4}$ alkylene optionally interrupted by —O—, —NH— or —S—. It is particularly preferred that L is optionally substituted $C_{1-4}$ alkylene, more particularly L is —CH$_2$—CH$_2$—.

Preferred optional substituents which may be present on $R^1$, $R^2$, $R^3$, $R^4$, $R^5$ and L may be independently selected from: optionally substituted alkyl (preferably $C_{1-4}$-alkyl), optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —SO$_2$F, hydroxy, ester, —NR$^a$R$^b$, —COR$^a$, —CONR$^a$R$^b$, —NHCOR$^a$, carboxyester, sulfone, and —SO$_2$NR$^a$R$^b$, wherein R$^a$ and R$^b$ are each independently H or optionally substituted alkyl (especially $C_{1-4}$-alkyl). Optional substituents for any of the substituents described for $R^1$, $R^2$, $R^3$, $R^4$, $R^5$ and L may be selected from the same list of substituents.

Preferably x has a value of 0.5 to 3.5, especially 0.5 to 3.0.
Preferably y has a value of 0.5 to 3.5, especially 0.5 to 3.0.
Preferably z has a value of 0.5 to 3.5, especially 0.5 to 3.0.

It is particularly preferred that in dyes of Formula (1) that x has a value of 0.5 to 3.5, y has a value of 0.5 to 3.5 and z has a value of 0.5 to 3.5.

In the dyes of Formula (1) the α-positions of the phthalocyanine ring are preferably unsubstituted, that is they carry a hydrogen substituent.

The dyes of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the dyes of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

A preferred a mixture of phthalocyanine dyes of Formula (1) is of Formula (2) and salts thereof:

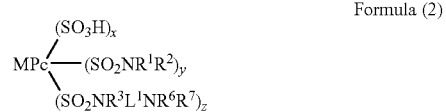

Formula (2)

wherein:

M Cu or Ni;

Pc represents a phthalocyanine nucleus of formula;

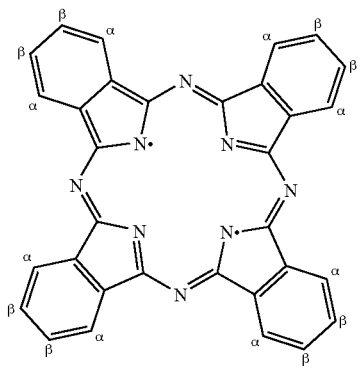

$L^1$ is optionally substituted $C_{1-8}$ alkylene optionally interrupted by —O—, —NH— or —S—;

$R^1$, $R^2$, $R^3$ and $R^4$ independently are H or optionally substituted $C_{1-4}$alkyl;

$R^7$ is H, optionally substituted aryl, optionally substituted alkyl or optionally heterocyclyl; or $R^6$ and $R^7$ together with the nitrogen atom to which they are attached represent an optionally substituted 5 or 6 membered aliphatic or aromatic ring;

x is 0.1 to 3.8;

y is 0.1 to 3.8;

z is 0.1 to 3.8;

the sum of (x+y+z) is 4; and the substituents, represented by x, y and z, are attached only to a β-position on the phthalocyanine ring.

A more preferred mixture of copper phthalocyanine dyes of Formula (1) is of Formula (3) and salts thereof:

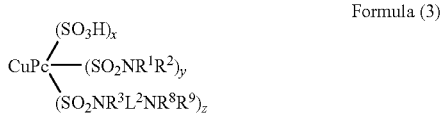

Formula (3)

wherein:

Pc represents a phthalocyanine nucleus of formula;

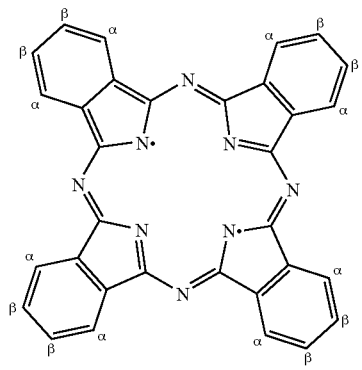

$L^2$ is optionally substituted $C_{1-4}$ alkylene;

$R^1$, $R^2$, $R^3$ and $R^8$ independently are H or methyl;

$R^9$ is H or phenyl bearing at least one sulfo, carboxy or phosphato substituent and having further optional substituents; or $R^8$ and $R^9$ together with the nitrogen atom to which they are attached represent an optionally substituted 5- or 6-membered aliphatic or aromatic ring;

x is 0.1 to 3.8;

y is 0.1 to 3.8;

z is 0.1 to 3.8;

the sum of (x+y+z) is 4; and the substituents, represented by x, y and z, are attached only to a β-position on the phthalocyanine ring.

In mixtures of phthalocyanine dyes of Formula (2) and Formula (3) preferences for $R^1$, $R^2$, $R^3$, x, y and z are as for Formula (1) and are as described above.

In mixtures of phthalocyanine dyes of Formula (2) and Formula (3) preferences for $L^1$ and $L^2$ are as described above for L.

In mixtures of phthalocyanine dyes of Formula (2) and Formula (3) preferences for $R^6$ and $R^8$ are as for $R^4$ and preferences for $R^7$ and $R^9$ are as for $R^5$ above in the first preferred embodiment of the invention. Preferences for $R^6$ and $R^8$, and $R^7$ and $R^9$ are as for $R^4$ and $R^5$ respectively in the second preferred embodiment.

Acid or basic groups on the dyes of Formula (1), particularly acid groups, are preferably in the form of a salt. Thus, the Formulae shown herein include the dyes in free acid and in salt form.

Preferred salts are alkali metal salts, especially lithium, sodium and potassium, ammonium and substituted ammonium salts (including quaternary amines such as ($(CH_3)_4N^+$) and mixtures thereof. Especially preferred are salts with sodium, lithium, ammonia and volatile amines, more especially sodium salts. The dyes may be converted into a salt using known techniques.

The dyes of Formula (1) may exist in tautomeric forms other than those shown in this specification. These tautomers are included within the scope of the present invention.

When the preferred route, as set out above, is used to synthesise dyes of Formula (1) are largely ammonium salts. However, any known techniques may be used to exchange ammonia for another cation for example, acidification optionally followed by dialysis, to remove the original cations with subsequent addition of the alternative cations. Use of ion exchange resins and reverse osmosis are amongst the other well-known techniques for exchanging one cation for another.

The dyes of Formula (1) have attractive, strong cyan shades and are valuable colorants for use in the preparation of ink-jet printing inks. They benefit from a good balance of solubility, storage stability and fastness to water and light. In particular they display excellent light and ozone fastness.

According to a second aspect of the present invention there is provided a composition comprising a mixture of phthalocyanine dyes according to the first aspect of the invention and a liquid medium.

Preferred compositions comprise:

(a) from 0.01 to 30 parts of a mixture of phthalocyanine dyesaccording to the first aspect of the invention; and (b) from 70 to 99.99 parts of a liquid medium;

wherein all parts are by weight

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid media comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine dyes in the liquid medium. Examples of polar solvents include $C_{1-4}$-alcohols.

In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the liquid medium is an organic solvent free from water it is a mixture of 2 to 5 different organic solvents. This allows a liquid medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; C.I. Acid Yellow 23; and any of the dyes used in ink-jet printers sold by Seiko Epson Corporation, Hewlett Packard Company, Canon Inc. & Lexmark International.

If the composition of the present invention contains phthalocyanine dyes other than those of Formula (1) then preferably at least 70% by weight, more preferably at least 80% by weight, especially at least 90% by weight, more especially at least 95% by weight and particularly at least 99% by weight of the total amount of phthalocyanine dye is of Formula (1) wherein the substituents, represented by x, y and z are attached to a β position on the phthalocyanine ring.

It is preferred that the composition according to the invention is an ink suitable for use in an ink-jet printer. Ink suitable for use in an ink-jet printer is an ink which is able to repeatedly fire through an ink-jet printing head without causing blockage of the fine nozzles.

An ink suitable for use in an ink-jet printer preferably has a viscosity of less than 20 cP, more preferably less than 10 cP, especially less than 5 cP, at 25° C.

An ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other component of the ink).

Preferably an ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably an ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying an ink according to the second aspect of the invention thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A fourth aspect of the present invention provides a material preferably paper, plastic, a textile, metal or glass, more preferably paper, an overhead projector slide or a textile material, especially paper more especially plain, coated or treated papers printed with a mixture of phthalocyanine dyes as described in the first aspect of the invention, a composition according to the second aspect of the invention or by means of a process according to the third aspect of the invention.

It is especially preferred that the printed material of the third aspect of the invention is a photograph printed using an ink-jet printer.

A fifth aspect of the present invention provides an ink-jet printer cartridge comprising a chamber and an ink wherein the ink is in the chamber and the ink is as defined in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

EXAMPLE 1

Analysis of Phthalocyanines

Conformation of the structure of dyes of Formula (1) is by mass spec. Elemental analysis is used to determine the ratios of x to y+z. Thus, when the sum of x plus y and z is not exactly 4 this is due to the presence of impurities. The presence of these impurities and their effect on the estimated values of x, y and z would be well known to a person skilled in the art who would appreciate that the value of x plus y plus z will not exceed 4 and who would treat the experimentally determined values of x, y and z as indicative of the true ratios of the groups.

Preparation of: the Following Dye Substituted Only in the β-Position where x is 1.2 and (y+z) is 3.2:

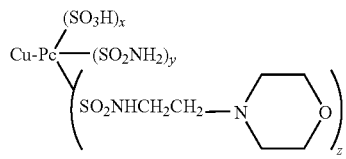

Stage 1

The following components; potassium 4-sulfophthalic acid (56.8 g), urea (120 g), CuCl$_2$ (6.9 g), ammonium molybdate (1.2 g) and 1,8-diazabicyclo[5.4.0]undec-7-ene (DBU) (7.5 g) were mixed in a reaction vessel.

The mixture was then warmed in stages (130° C./30 minutes, 150° C./30 minutes, 180° C./30 minutes, 220° C.) over 2 hours and the melt which formed was stirred at 220° C. for a further 2 hours.

The solid which formed was extracted 4 times with hot water (4×200 ml) and the extract was filtered to remove insoluble material.

The resultant filtrate was stirred at between 60° C.-70° C. and then sufficient sodium chloride was added to give 7% brine solution. Stirring was continued and the solid which precipitated was filtered, washed with a 10% brine solution (200 ml) and pulled dry by vacuum. The resultant damp solid (77.6 g) was slurried in acetone, filtered and dried first at room temperature and then at 50° C. Analysis revealed 3.8 sulfo groups per phthalocyanine.

Stage 2—Preparation of:

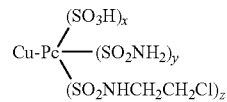

Phosphorous oxychloride (5.84 g) was added dropwise to chlorosulfonic acid (54.3 g) while keeping the reaction temperature below 30° C. The sulfonated phthalocyanine product of stage 1 (21 g) was then added to this mixture over 10-15 minutes while keeping temperature below 60° C. This reaction mixture was stirred at 60° C. for 10-15 minutes and then slowly heated to 138° C. to 140° C. and kept at this temperature, with stirring for 3 hours. At the end of this time the reaction mixture was cooled and stirred at room temperature overnight. The next day the reaction-melt was drowned onto a mixture of water/ice/salt/HCl (100 ml/200 g/4 g/ml ml), keeping the temperature below 0° C. using external cooling and further addition of ice as necessary. The resultant suspension was stirred at 0° C. for 20 minutes and then filtered, washed with acidified solution of ice cold 10% brine solution (100 ml) and pulled dry by vacuum to give a damp paste. This paste was then added in portions to a solution comprising 2-chloroethylamine hydrochloride (5.5 g), water (200 ml) and ice (100 g). The pH of the resultant suspension was adjusted to pH 7 with concentrated ammonia and then stirred at 10° to 20° C. at pH 7 to 7.5 for 3 hours. At the end of this time the reaction mixture was warmed to 37°-40° C., adjusted to pH 7.5 with concentrated ammonia and stirred for 1 hour 30 minutes. The mixture was then stirred at room temperature overnight. The next day the reaction mixture was warmed to 40° C. and stirred for 30 minutes. The pH of the reaction mixture was adjusted to less than 1 with concentrated HCl and NaCl was added to 10% brine with stirring. The precipitate which formed was filtered, washed with acidified 20% brine solution and pulled dry with a vacuum pump. The solid was filtered, pulled dry with a vacuum pump and dried at room temperature to give 17.2 g of product.

Stage 3

Preparation of the Title Product

The product of stage 2 (8 g) was mixed with 3.26 g of morpholine in 250 ml of water. This mixture was stirred at 60° to 70° C. while the pH was maintained above pH10 by the addition of 2M NaOH. After 1 hour there were no further changes in the pH and the mixture was then stirred for a further 3 hours. The reaction mixture was then filtered and the filtrate (300 ml) was adjusted to pH 6.5 with concentrated HCl and Na Cl added to give a 10% solution. This mixture was stirred and the precipitate which formed was filtered, washed with 100 ml of a 10% NaCl solution at pH 2 and then pulled as dry as possible with a vacuum pump. The solid was then slurried in 200 ml of deionised water at pH=8.5 (pH adjusted with NaOH), dialysed to low conductivity versus water and dried at 70° C. to give 6.7 g of product.

EXAMPLE 2

Preparation of: the Following Dye Substituted Only in the Beta Position wherein x is 1.3 and (y+z) is 2:

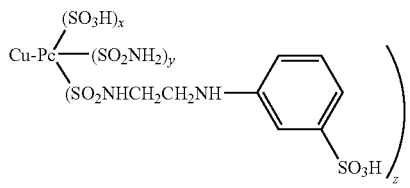

Stages 1 and 2 were carried out as described above for Example 1

Stage 3

Preparation of the Title Product

The product of stage 2 (5.5 g) was mixed with 4.33 g of metanillic acid in 150 ml of deionised water. This mixture was adjusted to pH9.8 and warmed with stirring to 70° C. while the pH was maintained above pH9.5 by the addition of 2M NaOH. The mixture was then stirred for a further 3 hours. The reaction mixture was then adjusted to pH 8 with concentrated HCl, allowed to cool to 40° C. and then NaCl was added to give a 15% solution. This mixture was stirred and the precipitate which formed was filtered, washed with 100 ml of a 20% NaCl solution and then pulled as dry as possible with a vacuum pump. The solid was then dissolved in deionised water, dialysed to low conductivity versus water and dried at 70° C. to give 5 g of product.

EXAMPLE 3

Preparation of: the Following Dye Substituted Only in the Beta Position wherein x is 0.5 and (y+z) is 4.2:

Prepared by an analogous process to Example 1 except that stage 3 was omitted and in stage 2 the chlorosulfonic acid phthalocyanine was reacted with N,N'-Bis(2-hydroxyethyl) ethylenediamine rather than 2-chloroethylamine hydrochloride. The molar ratio of ammonia and N,N'-Bis(2-hydroxyethyl)ethylenediamine used was 0.8 and 4 respectively.

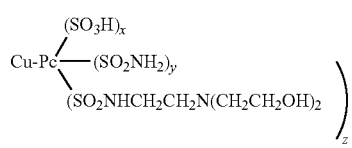

EXAMPLE 4

Preparation of: the Following Dye Substituted Only in the Beta Position wherein x is 1.1 and (y+z) is 3.6

Prepared by an analogous process to Example 3 except that the molar ratio of ammonia and N,N'-Bis(2-hydroxyethyl) ethylenediamine used was 1.1 and 2.2 respectively.

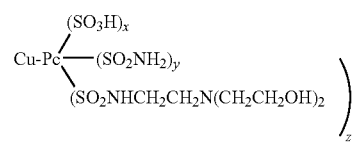

Comparative Dye 1

Comparative Dye 1 was C.I. Direct Blue 199 obtained as Pro-jet™ Cyan 1 from Avecia Ltd, as supplied this is a dye of Formula:

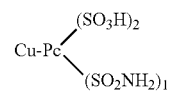

C.I. Direct Blue 199 is the most widely used cyan ink-jet dye and is made by sulfonation and amination of phthalocyanine pigment and comprises dye substituted in both the α and β positions.

Comparative Dye 2

Comparative Dye 2 was prepared, as in Example 1 of International Patent Application WO99/67334, by sulfonation of copper phthalocyanine pigment followed by amination/amidation, a process which resulted in a dye of formula:

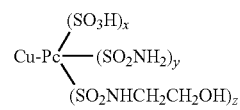

wherein the substituents are in both the α and β positions and where x is 2.7, y is 0.5 and z is 0.8.

EXAMPLE 5

Preparation of Inks 1 and 2 and the Comparative Inks

The dyes of Example 1 and 2 and the dyes of Comparative Example 1 and Comparative Example 2 were converted into inks by dissolving 39 of dye in 100 ml of a liquid medium comprising:

| | |
|---|---|
| Thiodiglycol | 5% |
| 2-Pyrollidone | 5% |
| Surfynol ™ 465 | 1% |
| Water | 89% |
| | (all % by weight) | and adjusting the pH of the ink to pH 8 with sodium hydroxide. An ink of this composition would be expected to have a viscosity of between 1 to 3 cp. Surfynol™ 465 is a surfactant from Air Products Ltd.

Ink-Jet Printing

The inks and the comparative inks were filtered through 0.45 micron nylon filters and then incorporated into empty ink-jet print cartridges using a syringe.

The inks were then printed onto Epson Premium Glossy Photopaper ("SEC PM") and Canon PR101 Photopaper ("PR101").

The prints, at 100%, were tested for ozone fastness by exposure to 1 ppm ozone at 40° C., 50% relative humidity for 24 hrs in a Hampden 903 Ozone cabinet. Fastness of the printed ink to ozone was judged by the difference in the optical density before and after exposure to ozone.

Light-fastness of the printed image was assessed by fading the printed image in an Atlas Ci5000 Weatherometer for 100 hours and then measuring the change in the optical density.

Optical density measurements were performed using a Gretag spectrolino spectrophotometer set to the following parameters:

| Measuring Geometry | 0°/45° |
| Spectral Range | 400-700 nm |
| Spectral Interval | 20 nm |
| Illuminant | D65 |
| Observer | 2° (CIE 1931) |
| Density | Ansi A |
| External Filler | None |

Light and Ozone fastness are assessed by the percentage change in the optical density of the print, where a lower figure indicates higher fastness, and the degree of fade. The degree of fade is expressed as $\Delta E$ where a lower figure indicates higher light fastness. $\Delta E$ is defined as the overall change in the CIE colour co-ordinates L, a, b of the print and is expressed by the equation $\Delta E = (\Delta L^2 + \Delta a^2 + \Delta b^2)^{0.5}$. Results for light and ozone fastness are shown below.

|  | Delta E PR101 | % OD Loss PR101 | Delta E SEC PM | % OD Loss SEC PM |
|---|---|---|---|---|
|  | Light Fastness | | | |
| Ink 1 | 7 | −3 | 1 | 0 |
| Ink 2 | 6 | −3 | 3 | −2 |
| Comparative Ink 1 | 21 | 30 | 4 | 9 |
| Comparative Ink 2 | 20 | 29 | 5 | 13 |
|  | Ozone Fastness | | | |
| Ink 1 | 1 | 0 | 0 | 0 |
| Ink 2 | 1 | 0 | 4 | 5 |
| Comparative Ink 1 | 51 | 51 | 19 | 28 |
| Comparative Ink 2 | 51 | 58 | 23 | 41 |

Clearly dyes according to the present invention display an enhanced ozone fastness and an equivalent or superior light fastness compared to dyes substituted in both the $\alpha$ and $\beta$ positions.

Further Inks

The inks described in Tables A and B may be prepared using the dyes made in Example 1 and 2. Numbers quoted in the second column onwards refer to the number of parts of the relevant ingredient and all parts are by weight. The inks may be applied to paper by thermal or piezo ink-jet printing.

The following abbreviations are used in Table A and B:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12 propane-1,2-diol
BDL=butane-2,3-diol
CET=cetyl ammonium bromide
PHO=$Na_2HPO_4$ and
TBT=tertiary butanol
TDG=thiodiglycol

TABLE A

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 1 | 10.0 | 85 | 3 |  | 3 | 3 |  |  |  | 5 | 1 |  |
| 2 | 2.1 | 91 |  | 8 |  |  |  |  |  |  |  | 1 |
| 1 | 3.1 | 86 | 5 |  |  |  |  | 0.2 | 4 |  |  | 5 |
| 2 | 1.1 | 81 |  |  | 9 |  | 0.5 | 0.5 |  | 9 |  |  |
| 1 | 2.5 | 60 | 4 | 15 | 3 | 3 |  |  | 6 | 10 | 5 | 4 |
| 2 | 5 | 65 |  | 20 |  |  |  |  | 10 |  |  |  |
| 1 | 2.4 | 75 | 5 | 4 |  | 5 |  |  |  | 6 |  | 5 |
| 2 | 4.1 | 80 | 3 | 5 | 2 | 10 |  | 0.3 |  |  |  |  |
| 1 | 3.2 | 65 |  | 5 | 4 | 6 |  |  | 5 | 4 | 6 | 5 |
| 2 | 5.1 | 96 |  |  |  |  |  |  |  | 4 |  |  |
| 1 | 10.8 | 90 | 5 |  |  |  |  |  | 5 |  |  |  |
| 2 | 10.0 | 80 | 2 | 6 | 2 | 5 |  |  | 1 |  | 4 |  |
| 1 | 1.8 | 80 |  | 5 |  |  |  |  |  |  | 15 |  |
| 2 | 2.6 | 84 |  |  | 11 |  |  |  |  |  | 5 |  |
| 1 | 3.3 | 80 | 2 |  |  | 10 |  |  |  | 2 |  | 6 |
| 2 | 12.0 | 90 |  |  | 7 | 0.3 |  | 3 |  |  |  |  |
| 1 | 5.4 | 69 | 2 | 20 | 2 | 1 |  |  |  |  | 3 | 3 |
| 2 | 6.0 | 91 |  |  | 4 |  |  |  |  | 5 |  |  |

TABLE B

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 1 | 1.5 | 85 | 5 | 5 | | 0.15 | 5.0 | 0.2 | | | | |
| 2 | 2.5 | 90 | | 6 | 4 | | | | | 0.12 | | |
| 1 | 3.1 | 82 | 4 | 8 | | 0.3 | | | | | | 6 |
| 2 | 0.9 | 85 | | 10 | | | | | 5 | 0.2 | | |
| 1 | 8.0 | 90 | | 5 | 5 | | | 0.3 | | | | |
| 2 | 4.0 | 70 | | 10 | 4 | | | | 1 | | 4 | 11 |
| 1 | 2.2 | 75 | 4 | 10 | 3 | | | | 2 | | 6 | |
| 2 | 10.0 | 91 | | | 6 | | | | | | 3 | |
| 1 | 9.0 | 76 | | 9 | 7 | | 3.0 | | | 0.95 | 5 | |
| 2 | 5.0 | 78 | 5 | 11 | | | | | | | 6 | |
| 1 | 5.4 | 86 | | | 7 | | | | | | 7 | |
| 2 | 2.1 | 70 | 5 | 5 | 5 | 0.1 | 0.2 | 0.1 | 5 | 0.1 | 5 | |
| 1 | 2.0 | 90 | | 10 | | | | | | | | |
| 2 | 2 | 88 | | | | | | 10 | | | | |
| 1 | 5 | 78 | | | 5 | | | 12 | | | 5 | |
| 2 | 8 | 70 | 2 | | 8 | | | 15 | | | 5 | |
| 1 | 10 | 80 | | | | | | 8 | | | 12 | |
| 2 | 10 | 80 | | 10 | | | | 8 | | | | |

The invention claimed is:

1. A mixture of phthalocyanine dyes of Formula (1) or salts thereof:

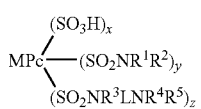

Formula (1)

wherein:

M is Cu or Ni;

Pc represents a phthalocyanine nucleus of formula;

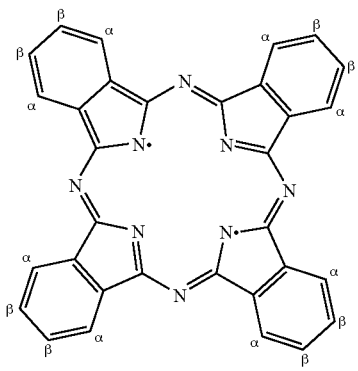

L is optionally substituted $C_{1-20}$ alkylene, alkyenylene or alkynylene, optionally interrupted by —O—, —NH— or —S—;

$R^1$, $R^2$, $R^3$ and $R^4$ independently are H or optionally substituted $C_{1-4}$alkyl;

$R^5$ is H or an optionally substituted hydrocarbyl; or $R^4$ and $R^5$ together with the nitrogen atom to which they are attached represent an optionally substituted 5- or 6-membered aliphatic or aromatic ring system;

x is 0.1 to 3.8;

y is 0.1 to 3.8;

z is 0.1 to 3.8;

the sum of (x+y+z) is 4;

the substituents, represented by x, y and z, are attached only to a β-position on the phthalocyanine ring; and the mixture of dyes of Formula (1) are obtainable by a process which comprises cyclisation of β-sulfo substituted phthalic acid, phthalonitrile, iminoisoindoline, phthalic anhydride, phthalimide or phthalamide in the optional presence of a suitable nitrogen source, and in the presence of a copper or nickel salt, and a base followed by chlorination, amination/amidation.

2. A mixture of phthalocyanine dyes according to claim 1 of Formula (2) or salts thereof:

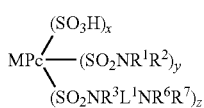

Formula (2)

wherein:

M Cu or Ni;

Pc represents a phthalocyanine nucleus of formula;

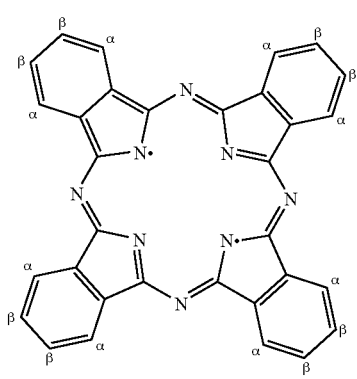

$L^1$ is optionally substituted $C_{1-8}$ alkylene optionally interrupted by —O—, —NH— or —S—;

$R^1$, $R^2$, $R^3$ and $R^6$ independently are H or optionally substituted $C_{1-4}$alkyl;

$R^7$ is H, optionally substituted aryl, optionally substituted alkyl or optionally heterocyclyl; or $R^6$ and $R^7$ together with the nitrogen atom to which they are attached represent an optionally substituted 5 or 6 membered aliphatic or aromatic ring;

x is 0.1 to 3.8;

y is 0.1 to 3.8;

z is 0.1 to 3.8;

the sum of (x+y+z) is 4;

the substituents, represented by x, y and z, are attached only to a β-position on the phthalocyanine ring: and the mixture of dyes of Formula (2) are obtainable by a process which comprises cyclisation of β-sulfo substituted phthalic acid, phthalonitrile, iminoisoindoline, phthalic anhydride, phthalimide or phthalamide in the optional presence of a suitable nitrogen source, and in the presence of a copper or nickel salt, and a base such as 1,8-diazabicyclo[5.4.0]undec-7-ene (DBU) followed by chlorination, amination/amidation.

3. A mixture of phthalocyanine dyes according to either claim 1 or claim 2 wherein M is Cu.

4. A mixture of phthalocyanine dyes according to claim 1 or claim 2 of Formula (3) or salts thereof:

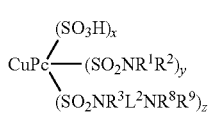

Formula (3)

wherein:

Pc represents a phthalocyanine nucleus of formula;

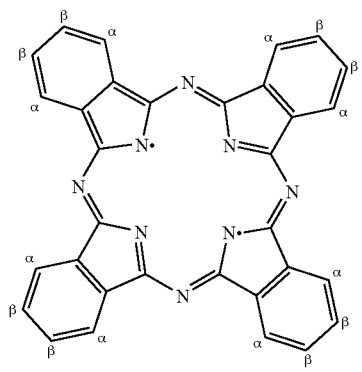

$L^2$ is optionally substituted $C_{1-4}$ alkylene;

$R^1$, $R^2$, $R^3$ and $R^8$ independently are H or methyl;

$R^9$ is H or phenyl bearing at least one sulfo, carboxy or phosphato substituent and having further optional substituents; or $R^8$ and $R^9$ together with the nitrogen atom to which they are attached represent an optionally substituted 5- or 6-membered aliphatic or aromatic ring;

x is 0.1 to 3.8;

y is 0.1 to 3.8;

z is 0.1 to 3.8;

the sum of (x+y+z) is 4;

the substituents, represented by x, y and z, are attached only to a β-position on the phthalocyanine ring; and the mixture of dyes of Formula (3) obtainable by a process which comprises by cyclisation of β-sulfo substituted phthalic acid, phthalonitrile, iminoisoindoline, phthalic anhydride, phthalimide or phthalamide in the optional presence of a suitable nitrogen source, and in the presence of a copper or nickel salt, and a base followed by chlorination, amination/amidation.

5. A mixture of phthalocyanine dyes according to claim 1 obtainable by a process which comprises cyclisation of 4-sulfo-phthalic acid in the presence of a nitrogen source, a copper or nickel salt and a base.

6. A mixture of phthalocyanine dyes according to claim 1 or claim 2 wherein x has a value of 0.5 to 3.0, y has a value of 0.5 to 3.0 and z has a value of 0.5 to 3.0.

7. A mixture of phthalocyanine dyes according to claim 1 or claim 2 free from fibre reactive groups.

8. A composition comprising a mixture of phthalocyanine dyes according to claim 1 and a liquid medium.

9. A composition according to claim 8 wherein the liquid media comprises a mixture of water and organic solvent or organic solvent free from water.

10. A composition according to either claim 8 or claim 9 wherein at least 70% by weight of the total amount of phthalocyanine dye is of Formula (1).

11. A composition according to claim 8 or claim 9 wherein at least 95% by weight of the total amount of phthalocyanine dye is of Formula (1).

12. A composition that comprises:
(a) from 0.5 to 15 parts of a mixture of phthalocyanine dyes according to claim 1; and
(b) from 99.5 to 85 parts of a liquid medium;
wherein all parts are by weight.

13. A composition according to claim 12 that comprises:
(c) from 1 to 5 parts of a mixture of phthalocyanine dyes according to any one of claims 1 to 7; and
(d) from 99 to 95 parts of a liquid medium;
wherein all parts are by weight.

14. A composition according to claim 8 or claim 9 which is an ink suitable for use in an ink jet printer.

15. A mixture of phthalocyanine dyes of Formula (1) and salts thereof according to claim 1 wherein M is Cu, $R^1$, $R^2$ and $R^3$ are hydrogen, L is $CH_2CH_2$— and $R^4$ and $R^5$ together with the nitrogen atom complete a morpholine ring.

16. A mixture of phthalocyanine dyes as claimed in claim 1, 2 or 4 wherein the copper salt is $CuCl_2$ and the base is 1,8-diazabicyclo[5.4.0]undec-7-ene (DBU).

17. A process for preparing a mixture of phthalocyanine dyes of Formula (1) or salts thereof which comprises cyclisation of β-sulfo substituted phthalic acid, phthalonitrile, iminoisoindoline, phthalic anhydride, phthalimide or phthalamide in the optional presence of a suitable nitrogen source, and in the presence of a copper or nickel salt, and a base followed by chlorination, amination/amidation.

* * * * *